(No Model.)
D. S. WING.
VEHICLE WHEEL.
No. 361,914. Patented Apr. 26, 1887.
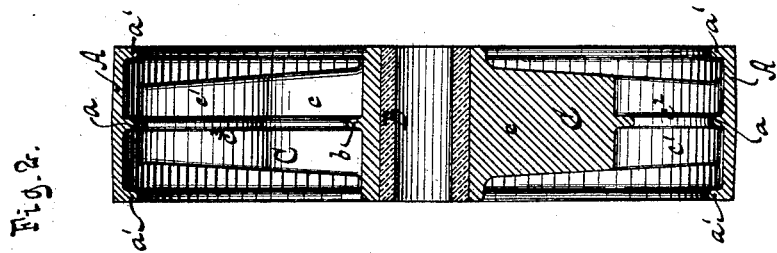
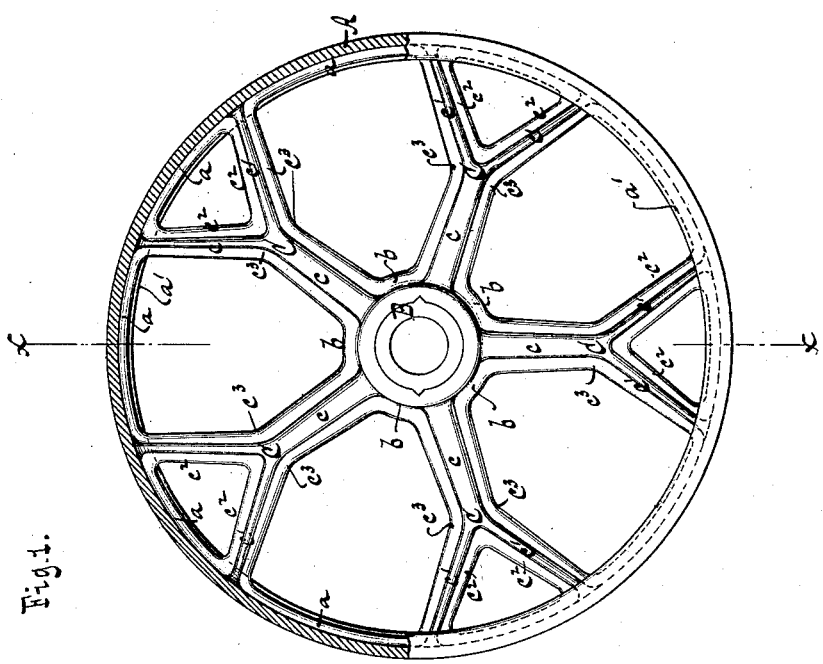
WITNESSES:
INVENTOR
Daniel S. Wing.
BY
Van Santvoord & Hauff
ATTORNEYS

UNITED STATES PATENT OFFICE.

DANIEL S. WING, OF SYRACUSE, ASSIGNOR OF ONE-EIGHTH TO WILLIAM A. CAMERON, OF NEW YORK, N. Y.

VEHICLE-WHEEL.

SPECIFICATION forming part of Letters Patent No. 361,914, dated April 26, 1887.

Application filed October 14, 1886. Serial No. 216,276. (No model.)

*To all whom it may concern:*

Be it known that I, DANIEL S. WING, a citizen of the United States, residing at Syracuse, in the county of Onondaga and State of New York, have invented new and useful Improvements in Vehicle-Wheels, of which the following is a specification.

This invention relates to certain improvements on the wheel which I have described in Letters Patent No. 328,555, granted to me October 20, 1885, said improvements being pointed out in the following specification and claims, and illustrated in the accompanying drawings, in which—

Figure 1 is a sectional side elevation. Fig. 2 is a transverse section in the plane $x\,x$, Fig. 1.

Similar letters indicate corresponding parts.

The wheel described in the patent above named is formed of malleable material and constructed with an outer rim and hub united integrally by spokes having divergent or bifurcated arms or brackets connecting with the wide rim. In applying this wheel on trucks used for such operations as loading or unloading vessels, I have found that if a heavy box or package is placed upon such a truck and the truck is run rapidly up against a stone or other obstruction either the rim of the wheel or one of the spokes, or both, are liable to become bent and practically spoiled.

The object of my present invention is to guard against such accidents, and I have accomplished this object by means such as illustrated in the drawings.

In the drawings, the letter A designates the outer rim or periphery of the wheel, B represents the hub thereof, and C designates the spokes as a whole. Said spokes consist of radiating arms $c$ and diverging extremities $c'\,c'$, which unite integrally with the hub B and with the rim A, respectively. In order to strengthen the rim A, and to prevent the same from being indented or broken if run against an obstruction, as above stated, I form at the inner surface of said rim, at about the middle of its width, a rib, $a$, which is intercepted by the extremities $c'\,c'$ of the spokes, and connects with ribs $c^2\,c^2$, formed on the inside of said extremities, and also with ribs $c^3\,c^3$, formed on the outside of the extremities $c'\,c'$, and on both sides of the radiating arms $c$, at the inner ends of which they connect with ribs $b$, formed on the hub B at about the middle of its length.

The width of the diverging extremities $c'\,c'$ of the spokes at their outer ends is less than that of the rim A, and on the edges of said rim are formed inwardly-projecting flanges $a'\,a'$, one on each side, which, together with the central rib, $a$, impart to the rim great strength in proportion to its weight.

I distinctly disclaim in this application the invention described in my Patent No. 328,555.

What I claim as new, and desire to secure by Letters Patent, is—

A metallic truck or vehicle-wheel constructed with an outer wide rim, A, and hub B, united integrally by spokes C, each of which have divergent arms $c'\,c'$, connected with the wide rim, each pair of divergent arms having divergent ribs $c^2$ on their inside and divergent ribs $c^3$ on their outside, the latter extending along the spokes and joined to ribs $b$ on the hub which connect with similar ribs on the adjacent spokes, and the wide rim having the rib $a$ joined to the divergent ribs $c^2$ and $c^3$, which extend along the inner and outer sides of the divergent arms, substantially as shown and described.

In testimony whereof I have hereunto set my hand and seal in the presence of two subscribing witnesses.

DANIEL S. WING. [L. S.]

Witnesses:
W. HAUFF,
E. F. KASTENHUBER.